United States Patent
Surani et al.

(10) Patent No.: US 9,928,099 B1
(45) Date of Patent: Mar. 27, 2018

(54) FINGERPRINT-BASED CAPACITY MANAGEMENT OF PHYSICAL HOSTS

(71) Applicant: Amazon Technologies, Inc., Seattle, WA (US)

(72) Inventors: Mihir Sadruddin Surani, Seattle, WA (US); Diwakar Gupta, Seattle, WA (US); Eric Paul Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/860,705

(22) Filed: Sep. 21, 2015

(51) Int. Cl.
*G06F 9/455* (2006.01)
*H04L 12/24* (2006.01)

(52) U.S. Cl.
CPC ...... *G06F 9/45558* (2013.01); *H04L 41/0869* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 2009/0070771 | A1* | 3/2009 | Yuyitung | G06Q 10/06 718/105 |
| 2013/0238786 | A1* | 9/2013 | Khesin | H04L 67/34 709/224 |
| 2014/0156958 | A1* | 6/2014 | Dow | G06F 3/0647 711/162 |

* cited by examiner

*Primary Examiner* — Sisley Kim
(74) *Attorney, Agent, or Firm* — Davis Wright Tremaine LLP

(57) ABSTRACT

A virtual computer system service receives a request to migrate a virtual machine instance from a first physical host to another physical host. The virtual computer system service identifies a configuration of the first physical host and obtains a data structure that specifies compatibility values for pairings of physical host configurations. The virtual computer system uses the configuration of the first physical host and the data structure to select a compatible physical host configuration. Using this compatible physical host configuration, the virtual computer system service selects a set of physical hosts that have this compatible physical host configuration. The set of physical hosts is used to select a second physical host onto which the virtual machine instance is migrated.

21 Claims, 8 Drawing Sheets

FINGERPRINT-BASED CAPACITY MANAGEMENT OF PHYSICAL HOSTS

BACKGROUND

Computing resource service providers and other service providers often maintain and operating various physical hosts to support various computing resources, including virtual machines, on behalf of their customers. These physical hosts may be part of a diverse heterogeneous fleet of physical hosts that are built using various characteristic axes. However, as new axes are introduced into the fleet, new comparisons may need to be performed in order to identify any compatible physical hosts within the fleet. This may result in additional expense and use of available resources, as these comparisons may need to be updated regularly with every introduction of a new characteristic axis for the fleet of physical hosts.

BRIEF DESCRIPTION OF THE DRAWINGS

Various embodiments in accordance with the present disclosure will be described with reference to the drawings, in which.

DETAILED DESCRIPTION

Figure 1:
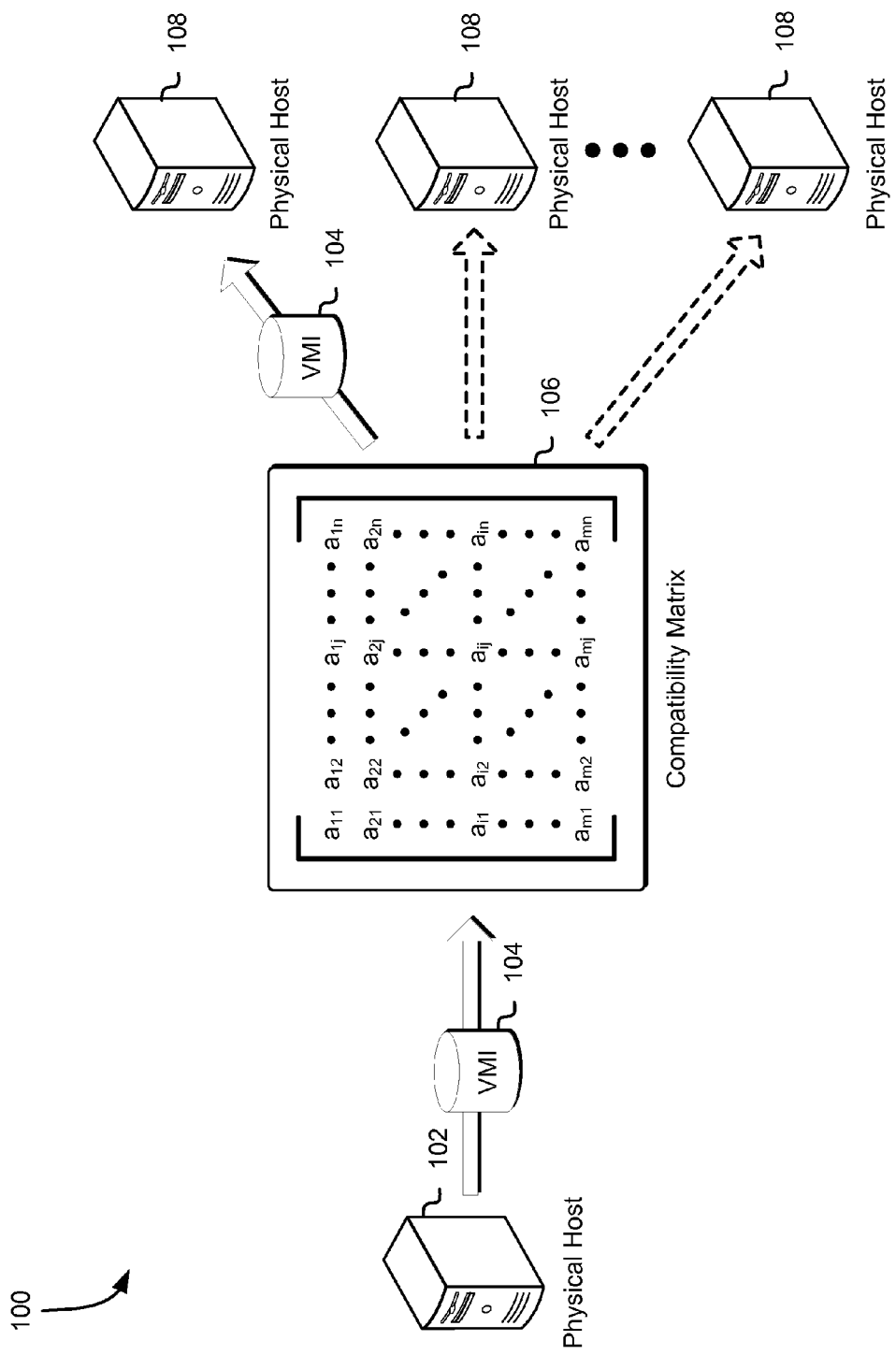
FIG. 1 shows an illustrative example of an environment in which a virtual machine is migrated from an originating physical host to a new physical host based at least in part on use of a compatibility matrix in accordance with at least one embodiment.

This disclosure relates to the use of physical host fingerprints (i.e., information that describes the hardware and software on the physical host) and a compatibility matrix for physical host fingerprints to identify compatible physical hosts within a fleet to support virtual machine instantiation and migrations. In one example, a virtual computer system service maintains a compatibility matrix which specifies compatibility among physical hosts of a fleet based at least in part on physical host fingerprints of these physical hosts. Each physical host fingerprint may be based on a number of different axes that may be used to define the characteristics of a physical host. For instance, the axes used to generate a physical host fingerprint may identify the virtual machine instance size compatibility of the physical host, the physical host type, the physical host vendor, hypervisors operating within the physical host, the physical host kernel, hardware processor version/type, memory speed, network bandwidth, and the like. In some examples, the physical host fingerprint is generated using a subset of available axes based on the impact of the subset of available axes to the compatibility of the physical hosts in the fleet.

When a new axis is introduced, the virtual computer system service may determine whether this new axis affects compatibility of the various physical hosts in the fleet. For instance, when a new axis is identified, the virtual computer system service may evaluate the ramifications of the introduction of this new axis and evaluate the physical hosts to determine what the impact on compatibility may be. If there is no impact to compatibility, the virtual computer system service may ignore this newly introduced axis, causing the physical hosts to continue use of the existing digital fingerprints for compatibility determinations. However, if the new axis does have an impact on compatibility, the virtual computer system service may cause the physical host agents to utilize this new axis, as well as any previously used axes, to generate new digital fingerprints that may be used to determine compatibility among the physical hosts of the fleet. Further, the virtual computer system service may update the compatibility matrix to specify compatibility among physical hosts with different configurations based at least on the corresponding digital fingerprints for each of the different configurations.

The virtual computer system service can utilize this compatibility matrix to identify a number of physical hosts of the fleet that can be used to instantiate a virtual machine. For instance, in some examples, when a virtual computer system service receives a request to instantiate a virtual machine, the virtual computer system service may determine a physical host fingerprint that corresponds to a physical host configuration that may be suitable for fulfillment of the request. Once the virtual computer system service has determined this physical host fingerprint, the virtual computer system service may use the compatibility matrix for the fleet of physical hosts and utilize the physical host fingerprint to identify a number of compatible host configurations that can be used to identify physical hosts that can instantiate the virtual machine. The virtual computer system service may select a physical host that has a configuration from the identified number of compatible host configurations and instantiate the virtual machine onto the selected physical host. In some examples, the compatibility matrix specifies various weights for fingerprint compatibility matches. The virtual computer system service may identify the weight for each of the identified number of compatible host configurations and select a physical host that has a configuration with the greatest weight for instantiation of the virtual machine.

In some examples, the virtual computer system service can also utilize the compatibility matrix to identify any physical host configurations that are compatible to a configuration of the current physical host to support migration of virtual machines from the current physical host to a new physical host. The virtual computer system service may obtain a physical host fingerprint from the current physical host in response to a request to migrate virtual machines from this current physical host. For instance, in response to the request, the physical host, through an agent, may evaluate the configuration of physical host and utilize these axes for the configuration to generate a digital fingerprint. This digital fingerprint may be specific to the physical host configuration and may be used, along with the compatibility matrix, to identify a number of compatible physical host configurations within the fleet that can support the virtual machines that are to be migrated. Once the virtual computer system service has identified a number of compatible physical hosts from the fleet that have the identified configurations, the virtual computer system service may select a physical host from the number of compatible physical hosts and migrate the virtual machines from the original physical host to the selected physical host. In some examples, and as described above, the compatibility matrix can specify weights for each compatible combination of physical host configurations. Thus, when compatible physical host configurations from the fleet are identified, the virtual computer system service may select a physical host having a configuration with the greatest weight for migration of the virtual machines.

In this manner, a virtual computer system service can identify compatible physical host configurations to support instantiation and migration of virtual machines within physical hosts of a fleet of physical hosts through use of physical host fingerprints and a compatibility matrix. In addition, the techniques described and suggested in this disclosure further allow for additional technical advantages. For instance, because the virtual computer system service is configured to determine whether a new axis has an impact on existing compatibility among the physical hosts of the fleet, the virtual computer system service may no longer need to perform a physical host-to-physical host comparison to determine compatibility, as a generic comparison may be performed through use of the compatibility matrix and the digital fingerprints generated by the various agents of these physical hosts. This compatibility matrix may not need to be updated if an axis does not impact compatibility, obviating the need for costly and unnecessary comparisons when a new axis that has no impact on compatibility is initially introduced.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 shows an illustrative example of an environment 100 in which a virtual machine 104 is migrated from an originating physical host 102 to a new physical host 108 based at least in part on use of a compatibility matrix 106 in accordance with at least one embodiment. In the environment 100, a physical host 102 may receive a request to migrate one or more virtual machine instances 104 from the physical host 102 to another physical host 108 within the fleet of physical hosts. In some examples, a "physical host" may refer to a computer system that is configured to launch and run one or more virtual machine instances. Each physical host 102, 108 may include one or more resource allocation units for the instantiation of virtual machines. For instance, these resource allocation units may serve to provide a guarantee average performance for the resource allocation unit for the life of the virtual machine instance by corresponding to an allocation of the various hardware resources of an underlying physical host 102, 108. Accordingly, when a virtual machine instance 104 is instantiated in a physical host 102, 108, the instance may be instantiated in one or more resource allocation units based on the hardware specifications necessary to instantiate and support the virtual machine instance 104.

In an embodiment, the physical host 102 includes an agent configured to evaluate the configuration of the physical host 102 to generate a digital fingerprint for the physical host 102. The digital fingerprint may include a vector that further includes one or more axes corresponding to one or more configuration parameters of the physical host 102 that may have an impact on the compatibility of the physical host 102 with other physical hosts 108 of the fleet. For instance, the digital fingerprint may be generated using axes (e.g., categories of different configuration characteristics) associated with the size of the resource allocation units included within the physical host, the physical host type, the vendor of the physical host and any components of the physical host, the hypervisors operating within the physical host, the physical host kernel, and the like. It should be noted that the digital fingerprint may not be specific to all possible configuration axes for the vector. For instance, if a particular configuration axis does not affect the compatibility of the physical hosts 102, 108 within the fleet, a physical host agent may not utilize this particular configuration axis to generate the digital fingerprint for the physical host. As an illustrative example, an administrator of the virtual computer system service may identify which configuration axes have an impact on compatibility or otherwise should be used to identify compatible configurations for physical hosts 102, 108. The administrator may, through an administrative interface, configure the physical host agent to utilize these configuration axes. Alternatively, the administrator may update a database to indicate the current configuration axes that are to be utilized to calculate the digital fingerprint. Thus, the agent may be configured to access this database to identify the configuration axes that have an impact on compatibility. In some embodiments, the digital fingerprint can be generated by obtaining the relevant configuration axes, defining the physical host vector, and calculating the digital fingerprint by inputting the value of each corresponding configuration axis (e.g., by concatenating the values together or otherwise canonicalizing the inputs into input suitable for the function being used) into a cryptographic hash function, such as SHA-1. Thus, the digital fingerprint may be specific to a configuration of the physical host 102, whereby the configuration is defined as a set of configuration values of the physical host 102.

When the virtual computer system service receives a request to migrate one or more virtual machine instances 104 from a physical host 102 to a new physical host 108, the virtual computer system service may obtain the digital fingerprint from the physical host 102. For instance, the virtual computer system service may transmit a request to the agent of the physical host 102, such as through one or more application programming interface (API) calls to the agent, to generate a digital fingerprint for the physical host 102. In response to the request, the agent of the physical host 102 may evaluate the physical host 102 to determine its configuration and generate the digital fingerprint utilizing the relevant axes required to determine compatibility. Once the agent of the physical host 102 has generated the digital fingerprint for the physical host 102, the agent may provide this digital fingerprint to the virtual computer system service for use in determining which physical hosts 108 of the fleet are compatible with the physical host 102. In some embodiments, the digital fingerprint is stored in a host fingerprint repository such that if there are no changes to the digital fingerprint or the applicable configuration axes, the virtual computer system service or the agent may obtain the digital fingerprint from this host fingerprint repository. It should be noted that while generation of the digital fingerprint may be performed upon receipt of a request to migrate virtual machine instances 104, the digital fingerprint may be generated at any time or under different circumstances. For instance, in some embodiments, when a physical host 102 is provisioned into the fleet, the virtual computer system service can generate the digital fingerprint of the physical host 102 and store this digital fingerprint in the aforementioned host fingerprint repository. Thus, when a request is received to migrate virtual machine instances 104 from a physical host 102 to a new physical host 108, the virtual computer system service may obtain the digital fingerprint of the physical host 102 from the host fingerprint repository.

Once the virtual computer system service has obtained the digital fingerprint from the agent of the physical host 102, the virtual computer system service may obtain a compatibility matrix 106 usable to identify compatible physical hosts within the fleet. The compatibility matrix 106 may specify which physical host configurations are compatible with other physical host configurations within the fleet. For instance, the compatibility matrix 106 may have, within a first axis, identifiers for originating physical host digital fingerprints specific to particular configurations and, as a second axis, identifiers for destination physical host digital fingerprints specific to the particular configurations. In some embodiments, the virtual computer system service is provided, by an administrator of the virtual computer system service or other entity responsible for maintaining the service, identifiers for known digital fingerprints, as well as known compatibility among the various physical hosts of the fleet. For instance, administrators of the virtual computer system service may perform one or more tests using different physical host configurations to determine compatibility among the possible physical host configurations. Alternatively, the process for determining compatibility among the various physical hosts of the fleet may be automated. For instance, the virtual computer system service may deploy one or more test virtual machine instances to physical hosts 102, 108 having different configurations (e.g., digital fingerprints) and perform one or more tests to determine how virtual machine instances perform upon migration from one physical host to another. The results of these one or more tests may be used to generate the compatibility matrix 106. In some embodiments, the virtual computer system service may maintain various compatibility matrices, each of which may correspond to a particular virtual machine instance type.

It should be noted that while compatibility matrices are used extensively throughout the present disclosure for the purpose of illustration, other data structures may be used to determine compatibility of different configurations of the fleet. For example, the virtual computer system service may maintain a compatibility data structure, which may be a data table. Similarly, the virtual computer system service may maintain a database whereby the virtual computer system service may utilize a digital fingerprint to perform one or more lookups based on fingerprints. For example, the database may be any key value store where digital fingerprints are keys and physical host configurations or their digital fingerprints are the values. In yet another example, a service may be configured to receive digital fingerprints and, in response, specify compatible physical host configurations or compatible hosts themselves.

The virtual computer system service may determine the identifier for the obtained digital fingerprint and identify the corresponding portion of the compatibility matrix 106 that corresponds to entries for the originating physical host digital fingerprint. The virtual computer system service may determine, based at least in part on the entries for the originating physical host digital fingerprint, digital fingerprints of configurations of other physical hosts 108 that may be compatible with the originating physical host 102. For instance, the compatibility matrix 106 may include, for each entry in the matrix, a binary value (e.g., 0 or 1) which may indicate whether a configuration of a physical host 108 is compatible or not compatible with the configuration of the originating physical host 102. For example, if the compatibility matrix value for a particular pairing of physical host configurations is zero (e.g., 0), then this may indicate that the physical host configurations are not compatible. Alternatively, if the compatibility matrix value for a pairing of physical host configurations is a non-zero value, then this may indicate compatibility between the physical host configurations of the pairing. It should be noted that the compatibility matrix 106 need not utilize solely numerical values to denote compatibility of physical host configurations. For instance, the compatibility matrix 106 may be generated such that for each physical host pairing, the compatibility matrix value may specify "ideal," "good," "preferred," or other similar identifiers to denote compatibility. Alternatively, if the value specifies "not ideal," "not compatible," "not preferred," or other similar identifiers, this may denote that the physical host configurations are not compatible or should otherwise not be utilized.

In some embodiments, the values within the compatibility matrix 106 are weighted such that each physical host 108 configuration may be assigned a greater or lesser weight for compatibility with a particular physical host 102 configuration. For example, as noted above, the virtual computer system service may evaluate how virtual machine instances perform upon migration from one physical host to another. Using the results of this evaluation, the virtual computer system service may identify ideal configurations whereby there is a reduced probability of instance failure upon migration. This calculated probability may be utilized as the weighted value for each physical host configuration pairing in the compatibility matrix 106. Alternatively, an administrator may determine an ordering of preferences for certain pairings. This may be based at least in part in the availability of physical hosts with particular configurations, the results of the evaluation, and the like.

Once the virtual computer system service has identified one or more compatible physical host configurations through use of the compatibility matrix 106, the service may select a compatible physical host that has one of the identified configurations for placement of the one or more virtual machine instances 104. For instance, the virtual computer system service may select any of the physical hosts that have an identified compatible configuration and have sufficient capacity to support the one or more virtual machine instances 104 being migrated from the originating physical host 102. Alternatively, if the compatibility matrix values are weighted for each destination physical host configuration, the virtual computer system service may select a physical host configuration that has the highest corresponding weight value from the compatibility matrix 106 and determine whether any physical host having this configuration has sufficient capacity to support the virtual machine instances 104. Once the virtual computer system service has selected a destination physical host 108, the virtual computer system service may migrate the one or more virtual machine instances 104 from the originating physical host 102 to the selected destination physical host 108.

In an embodiment, the virtual computer system service can further fulfill requests to instantiate one or more virtual machine images 104 within a destination physical host through analysis of the compatibility matrix 106. For instance, when the virtual computer system service receives a request to instantiate a virtual machine instance, the virtual computer system service may determine a digital fingerprint of a physical host 102 configuration that is suitable for fulfillment of the request. For example, the virtual computer system service may evaluate the particular virtual machine that is to be instantiated to identify a possible configuration of a physical host that may be used to instantiate the virtual machine. This possible configuration may be used to identify the relevant axes of compatibility for this hypothetical physical host 102, which may subsequently be used to generate a digital fingerprint for the configuration. The virtual computer system service may obtain the compatibility matrix 106 and utilize the digital fingerprint of the hypothetical physical host 102 configuration to identify any compatible physical host configurations that may be used to select a physical host 108 to instantiate the virtual machine 104. Thus, the virtual computer system service may select a physical host 108 that has an identified physical host configuration and instantiate the virtual machine 104 onto the selected physical host 108 to fulfill the request.

If the virtual computer system service identifies one or more newly introduced axes for the physical hosts 102, 108, such as through administrator configuration changes to the service, the virtual computer system service may determine whether these newly introduced axes have an impact on the compatibility of the physical hosts 102, 108 of the fleet. For instance, if the introduction of a new axis would result in a compatibility change among any number of physical hosts 102, 108, the virtual computer system service may transmit a notification to the agents of the physical hosts 102, 108 to indicate that new digital fingerprints are to be generated using previously used axes and this new axis. The introduction of a new axis into the digital fingerprint may result in a greater number of possible digital fingerprints for the fleet. As a result, the virtual computer system service may update the compatibility matrix to include these new possible digital fingerprints and specify the compatibility of the configurations of the physical hosts 102, 108 based at least in part on these new digital fingerprints.

In some embodiments, the virtual computer system service can utilize historical compatibility data to determine whether a new axis of compatibility has a particular impact to compatibility for the physical hosts 102, 108 of the fleet. For instance, if a particular pairing of physical host configurations were previously determined to be compatible, the virtual computer system service may determine that introduction of this new axis may not impact the compatibility of the physical host configurations of this pairing. For instance, through use of a host compatibility engine, the virtual computer system service may evaluate instance migration and instantiation logs to determine whether migration and/or instantiation of virtual machine instances onto physical hosts has been performed successfully. For example, the logs could indicate whether the migration or instantiation was successful or unsuccessful. The host compatibility engine can parse the logs and count the successful or unsuccessful indicators. Based at least in part on this evaluation of these logs, the host compatibility engine may determine the frequency of errors or mismatches among the various configuration pairs in the fleet. If the frequency is below a threshold frequency (established by the service or administrators of the service), the virtual computer system service may determine that the current configuration axes are sufficient for identifying compatible physical hosts. Thus, when a new axis is introduced, the virtual computer system service may evaluate any pairings for which there was no compatibility to determine whether the new axis may impact compatibility and make these physical host configurations compatible. If so, then the virtual computer system service may determine that the new axis does have an impact on compatibility and update the compatibility matrix. In some embodiments, the virtual computer system service can utilize the historical compatibility data to determine whether the use of existing axes of compatibility have resulted in compatibility mismatches or errors in migration or instantiation of virtual machines 104. For instance, the virtual computer system service may evaluate instance migration and instantiation logs to determine the frequency of errors or mismatches among the various configuration pairs in the fleet. If this frequency exceeds a maximum threshold frequency, the host compatibility engine may determine that additional configuration axes may be needed to identify compatible configurations. Thus, if the existing axes of compatibility have historically resulted in various mismatches or errors, the virtual computer system service may introduce one or more new axes of compatibility to improve the accuracy in identifying the compatibility of the physical hosts 102, 108 of the fleet.

Figure 2:
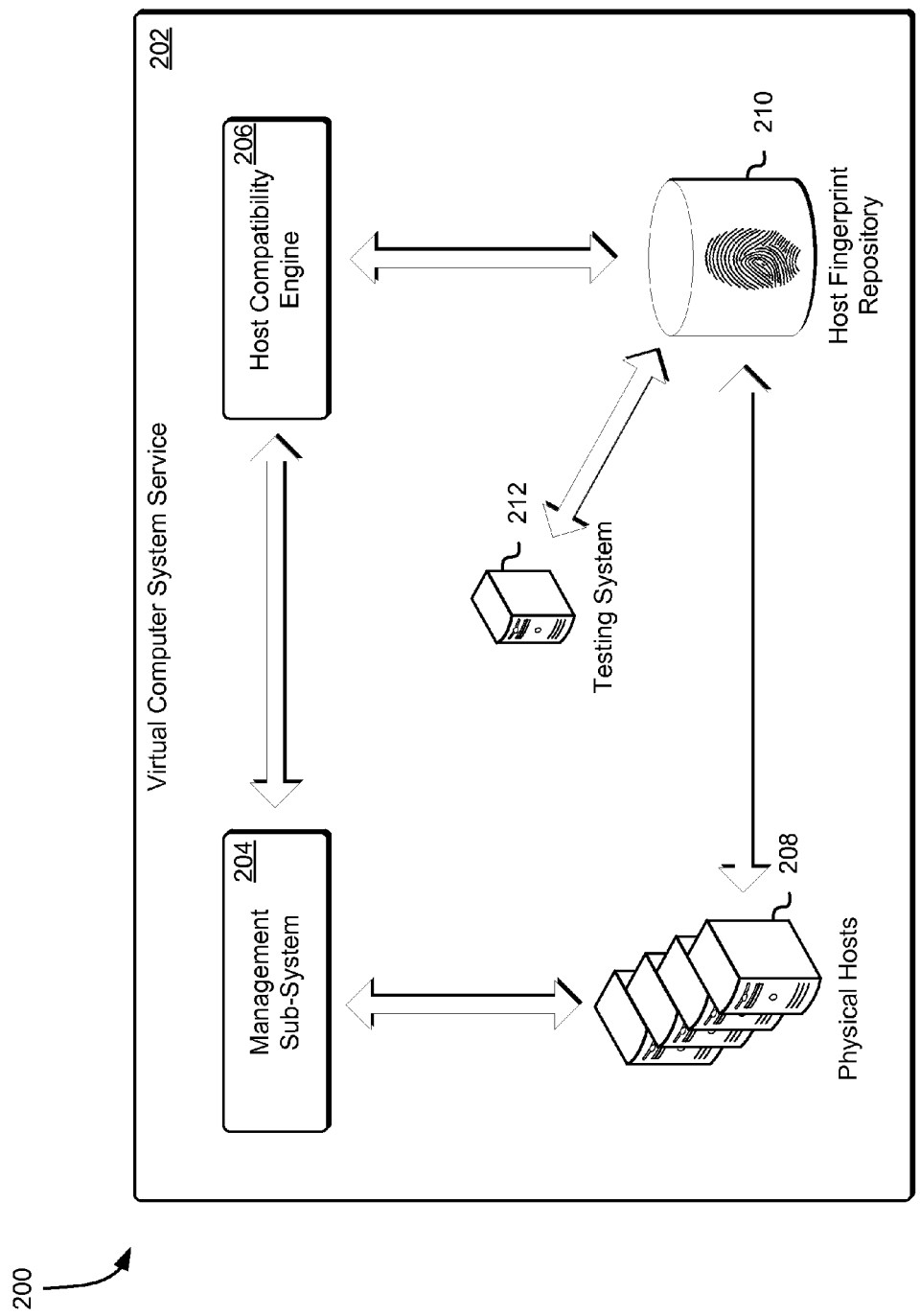
FIG. 2 shows an illustrative example of an environment in which components of a virtual computer system service are configured to utilize physical host fingerprints and a compatibility matrix to perform virtual machine migrations and instantiations in accordance with at least one embodiment.

As noted above, a virtual computer system service may be configured to utilize a compatibility matrix and a digital fingerprint from a physical host to identify any compatible physical host configurations of physical hosts within the fleet that may be used for migration of virtual machine instances from the physical host, for instantiation of virtual machine instances, or for other purposes. Accordingly, FIG. 2 shows an illustrative example of an environment 200 in which components of a virtual computer system service 202 are configured to utilize physical host fingerprints and a compatibility matrix to perform virtual machine migrations and instantiations in accordance with at least one embodiment. In the environment 200, the virtual computer system service 202 may include a management sub-system 204 configured to process customer requests to instantiate or otherwise migrate virtual machine instances. Further, the management sub-system 204 may be configured to detect any changes among the physical hosts 208 of the fleet to determine whether any virtual machine instances need to be migrated due to hardware failures, reboots, or other changes associated with any of the physical hosts 208 of the fleet. The management sub-system 204 may include one or more computer systems or a module of a computer system configured to execute one or more tasks based at least in part on obtained customer requests and on detected issues associated with the physical hosts 208 of the fleet.

When the management sub-system 204 receives a request to migrate one or more virtual machine instances from a physical host to a compatible physical host, the management sub-system 204 may transmit a request to the originating physical host to generate a digital fingerprint corresponding to the present configuration of this physical host. As noted above, the digital fingerprint may specify values for various configuration axes that may impact compatibility of the physical host with other physical hosts 208 of the fleet. For example, if the configuration axes include processor capabilities, storage capacity, and virtualization system, the vector utilized to generate the digital fingerprint may specify, for example, [1.10 GHz, 6.0 TB, Xen 4.5]. This physical host vector may be used to calculate the digital fingerprint by inputting the vector into a cryptographic hash function, such as SHA-1. The originating physical host, upon receiving this request, may generate a digital fingerprint corresponding to the configuration of this physical host and transmit the digital fingerprint to a host fingerprint repository 210 for storage and further processing. The host fingerprint repository 210 may include one or more datastores configured to store digital fingerprints for each of the configurations of the physical hosts 208 in the fleet. In some embodiments, the host fingerprint repository 210 includes historical data for the configurations of each of the physical hosts 208 of the fleet, including any previously obtained digital fingerprints for the configurations of the physical hosts 208. Thus, in some examples, the management sub-system 204 may instead access the host fingerprint repository 210 to identify the digital fingerprint of the originating physical host. It should be noted that in some embodiments, the digital fingerprint for a physical host configuration is generated when the physical host is initially provisioned. This digital fingerprint may be stored within the host fingerprint repository 210 for later use. Thus, this may enable the management sub-system 204 to access the host fingerprint repository 210 to obtain the digital fingerprint of a physical host 208.

In response to the request from the management sub-system 204, the physical host may further provide the digital fingerprint to the management sub-system 204. This may cause the management sub-system 204 to transmit a request to a host compatibility engine 206 to identify any physical hosts 208 that may be compatible to the originating physical host. The host compatibility engine 206 may be a computer system module or process configured to utilize and maintain one or more compatibility matrices usable to determine the compatibility among physical hosts 208 of the fleet. For instance, in response to the request from the management sub-system 204, the host compatibility engine 206 may obtain, from the host fingerprint repository 210, a compatibility matrix that specifies the compatibility of physical host configurations of the fleet. In some embodiments, the host compatibility engine 206 can obtain the digital fingerprint from the host fingerprint repository 210 upon receiving the request from the management sub-system 204 to identify any compatible physical hosts 208. This may obviate the need for the management sub-system 204 to obtain the digital fingerprint, as the digital fingerprint may be automatically stored in the host fingerprint repository 210 and accessible to the host compatibility engine 206. The compatibility matrix may include an axis corresponding to digital fingerprints of originating physical host configurations and another axis corresponding to digital fingerprints of destination physical host configurations. The host compatibility engine 206 may utilize the digital fingerprint of the originating host and identify a corresponding matrix axis value that corresponds to this digital fingerprint. Through the host compatibility matrix, the host compatibility engine 206 may determine digital fingerprints of destination physical host configurations that may be compatible with the originating physical host. The host compatibility engine 206 may provide identifiers of these compatible destination physical host configurations to the management sub-system 204 to fulfill the request. The management sub-system 204 may select a physical host that has a compatible destination physical host configuration based at least in part on the information provided by the host compatibility engine 206. In some embodiments, the management sub-system 204 can perform a best-fit analysis based at least in part on the determination of the host compatibility engine 206 of the digital fingerprints of destination physical host configurations that are compatible with the originating physical host. For instance, the management sub-system 204 may determine, of the identified destination physical host configurations, which destination physical host configuration shares the most common hardware and software components or specifications as that of the originating physical host configuration. The management sub-system 204 may then select the destination physical host configuration having the most common components or specifications as the originating physical host configuration.

In some embodiments, the values specified within the compatibility matrix may be weighted such that certain destination physical host configurations may have a higher degree of compatibility than other destination physical hosts for a particular originating physical host. For instance, rather than having only a binary value (e.g., 0 or 1) for each physical host configuration pairing, the compatibility matrix may be configured to have any value that may properly be used to specify different weight values for each pairing. As an illustrative example, a pairing may be assigned a value between 0 and 1 to denote the degree of compatibility between the physical host configurations of the pairing, with a higher value denoting a higher degree of desirable compatibility. The host compatibility engine 206 may thus select a destination physical host configuration that has the highest compatibility weight value and provide the identifier of this destination physical host configuration in response to the request from the management sub-system 204.

Once the management sub-system 204 has selected or otherwise been provided with an identifier of the destination physical host, the management sub-system 204 may transmit a request to the originating physical host to migrate its existing virtual machine instances to the selected destination physical host. In response to this request, the originating physical host may migrate its existing virtual machine instances to the destination physical host. The destination physical host may instantiate these virtual machine instances and make them available for use.

In some embodiments, the management sub-system can determine whether a newly identified axis has an impact on compatibility of the physical hosts 208 and, if so, cause the compatibility matrix to be modified to incorporate any new digital fingerprints generated as a result of this newly identified axis. For instance, if the management sub-system 204 identifies a new axis, such as through virtue of a change in the configuration of the management sub-system 204 or through an API call from another computer system associated with an administrator or other entity tasked with managing the virtual computer system service 202, the management sub-system 204 may evaluate the current compatibility matrix to identify the current compatibility among the configurations of the physical hosts 208. Subsequently, the management sub-system 204 may generate one or more new digital fingerprints using previously used axes and the newly identified axis to determine whether there is any impact on the compatibility among the configurations of the physical hosts 208. In some instances, a new axis may be introduced if an administrator or other testing process, as described above, determines that use of the other axes has historically resulted in compatibility mismatches and/or errors. The new axis may be introduced to address these mismatches and achieve more accurate compatibility results.

If a newly identified axis has an impact on the compatibility of the physical hosts 208, the management sub-system 204 may transmit a request to the agents of the physical hosts 208 to generate new digital fingerprints that incorporate this newly identified axis. Further, an administrator or other testing system 212 may update the compatibility matrix based at least in part on new possible digital fingerprint combinations since new configuration axes may enable creation of additional configuration permutations. Since the newly identified axis may have more than one possible value, new sets of digital fingerprints may be generated. The updated compatibility matrix may indicate which physical host configurations are compatible based at least in part on this new axis and the previously used axes in the request. This may enable the host compatibility engine 206 to provide updated compatibility results based at least in part on the updated compatibility matrix.

The physical hosts 208, upon generating the new digital fingerprints, may transmit these new digital fingerprints to the host fingerprint repository 210 for storage. The host compatibility engine 206 may utilize the information from the management sub-system 204 to identify the digital fingerprints for each of the physical host configurations and utilize these sets of information to update the compatibility matrix. Thus, the compatibility matrix may include additional vectors corresponding to the newly generated fingerprints.

Figure 3:
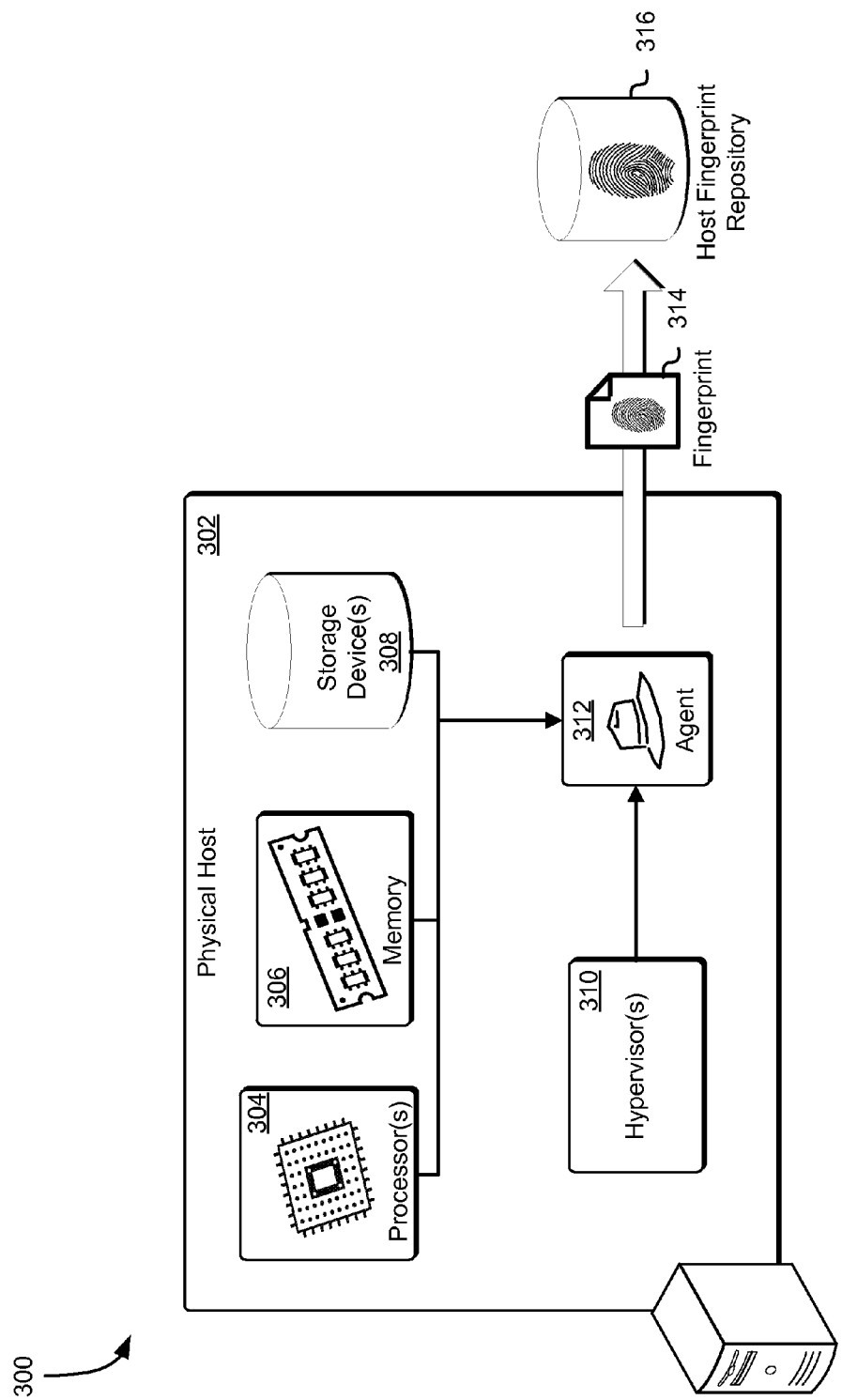
FIG. 3 shows an illustrative example of an environment in which an agent of a physical host obtains configuration information of the physical host to generate a physical host fingerprint in accordance with at least one embodiment.

As noted above, each physical host of the fleet may include an agent which may be configured to evaluate the configuration of the physical hosts for values to a variety of configuration axes corresponding to characteristics of the physical hosts. Of these configuration axes, the agent may identify the configuration axes that have an impact to the compatibility of the configurations of the physical hosts of the fleet. The values for these identified configuration axes may be used to generate a digital fingerprint that may be used to identify other compatible physical hosts. Accordingly, FIG. 3 shows an illustrative example of an environment 300 in which an agent 312 of a physical host 302 obtains configuration information of the physical host 302 to generate a physical host fingerprint 314 in accordance with at least one embodiment.

In the environment 300, a physical host 302 may include various components that collectively may be used to maintain and support one or more resource allocation units and the virtual machine instances that may be operating using any number of these resource allocation units. For instance, the physical host 302 may include one or more processors 304, memory 306 (e.g., random-access memory (RAM), dynamic RAM (DRAM), synchronous DRAM (SDRAM), Rambus DRAM (RDRAM), etc.), one or more storage devices 308, one or more hypervisors 310, and any other components that may be used in the operation of the physical host 302. In addition to these components, the physical host 302 may further include an agent 312 that may be configured to evaluate each of the aforementioned components to identify values for a number of different configuration axes. For instance, the agent 312 may transmit an API call to each component to obtain detailed information about each of these components that may be used to identify the value for the corresponding axes.

The agent 312 may utilize the values for the configuration axes to generate a digital fingerprint 314 for the physical host 302. In order to generate this digital fingerprint 314, the agent 312 may determine which configuration axes have an impact on compatibility of the physical hosts of the fleet. For instance, the agent 312 may receive a request from the virtual computer system service to generate a digital fingerprint 314 using a particular set of configuration axes as defined by the virtual computer system service. Alternatively, the agent 312 may be configured with a predefined set of configuration axes that are to be used to generate the digital fingerprint 314.

Once the agent 312 has generated the digital fingerprint 314 of the configuration of the physical host 302, the agent 312 may transmit the digital fingerprint 314 to a host fingerprint repository 316 for storage. The host fingerprint repository 316 may make the digital fingerprint 314 available to a host compatibility engine of the virtual computer system service or to the management sub-system of the service to identify one or more physical host configurations of physical hosts that may be compatible to the physical host 302. Thus, if a request is received to migrate one or more virtual machine instances from the physical 302 to a new physical host, the host compatibility engine may utilize the digital fingerprint 314 of the physical host 302 from the host fingerprint repository 316 and utilize the compatibility matrix to identify any compatible physical host configurations and, thereby, physical hosts having these configurations. The management sub-system may then use this information to select an appropriate physical host for migration of the virtual machine instances.

In an embodiment, the agent 312 can generate new digital fingerprints 314 in the event that a new axis is to be incorporated into the digital fingerprint 314. For instance, the agent 312 may incorporate any values previously collected for any axes into the digital fingerprint 314 by adding the value to a vector of axes values that may be used to create the digital fingerprint 314. As an illustrative example, if the virtual computer system service identifies a known axis as being essential to compatibility and this known axis has not been previously incorporated into the digital fingerprints, the virtual computer system service may transmit a request to the agent 312 to incorporate this known axis. Accordingly, the agent 312 may identify the value for this known axis (as previously obtained through an analysis of the various components of the physical host 302) and add this value to the vector used to generate the digital fingerprint 314.

Figure 4:
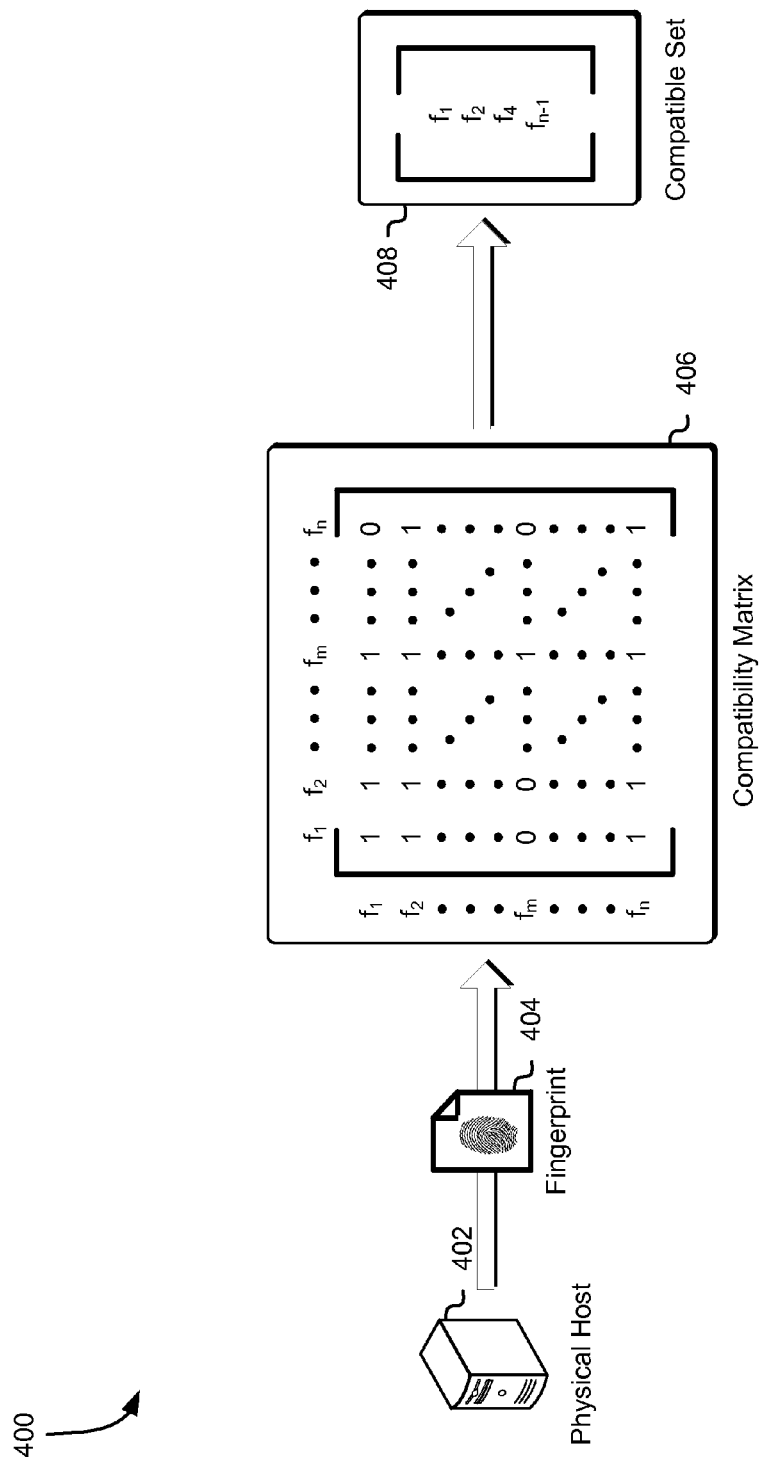
FIG. 4 shows an illustrative example of an environment in which a physical host fingerprint is utilized to determine a compatible set of physical hosts for migration of a virtual machine from a physical host in accordance with at least one embodiment.

As noted above, a virtual computer system service may utilize a digital fingerprint corresponding to a configuration of an originating physical host to identify a compatible set of destination physical host configurations that may be used to identify a physical host for migration of virtual machine instances. The virtual computer system service may obtain a compatibility matrix and use the compatibility matrix and the digital fingerprint to identify this compatible set of destination physical host configurations. Accordingly, FIG. 4 shows an illustrative example of an environment 400 in which a physical host fingerprint 404 is utilized to determine a compatible set of physical hosts 408 for migration of a virtual machine from a physical host 402 in accordance with at least one embodiment.

In the environment 400, a physical host 402, through an agent operating within the physical host 402, may generate a digital fingerprint 404 specific to the configuration of the physical host 402 and to identify other compatible configurations of physical hosts of the fleet. The digital fingerprint 404 may include a representation of a vector that includes a value for each configuration axis. The configuration axes may each correspond to various configuration parameters of the physical host 402 as described above (e.g., processors, memory, hypervisors, storage devices, resource allocation unit size, etc.). The physical host 402 may generate the digital fingerprint 404 in response to a request from the virtual computer system service, such as when a digital fingerprint 404 is required to identify one or more compatible physical host configurations for migration of one or more virtual machine instances to another physical host. In some embodiments, the agent of the physical host 402 will generate a digital fingerprint 404 when the physical host 402 is initially made operational such that information about the physical host 402 is made available to support migration and instantiation requests. The digital fingerprint 404 may be stored within a host fingerprint repository for later use.

The virtual computer system service may obtain the digital fingerprint 404 from the physical host 402 or the host fingerprint repository to identify any compatible physical hosts in the fleet that may be used to fulfill a migration request. The virtual computer system service may further obtain a compatibility matrix 406 that specifies compatibility values for pairings of physical host configurations in the fleet based at least in part on the digital fingerprints of these physical host configurations. For instance, the compatibility matrix 406 may be a square matrix whereby one axis of the compatibility matrix 406 may correspond to digital fingerprints (represented by values of $f_1$ through $f_n$ on the vertical axis in FIG. 4) of originating physical host configurations (e.g., physical host 402) and another axis may correspond to digital fingerprints (represented by values of $f_1$ through $f_n$ on the horizontal axis in FIG. 4) of destination physical host configurations. Since the originating physical hosts and the destination physical hosts may be selected from among the fleet of physical hosts, a physical host may be both an originating physical host in some instances and a destination physical host in other instances. Thus, all possible digital fingerprints may be represented in both axes of the compatibility matrix 406. The values within the compatibility matrix 406 may indicate compatibility between physical host configurations of a pairing. For instance, in this illustrative example, a "0" may denote that physical host configurations for the pairing are not compatible, whereas a "1" may denote that physical host configurations for the pairing are compatible.

It should be noted that alternatives to the compatibility matrix 406 may also be utilized. For example, in some instances the rows of the compatibility matrix 406 may be indexed based at least in part on the various digital fingerprints of the physical host configurations, while the columns may be indexed based at least in part on the configurations of the physical hosts themselves, thereby obviating the need for a digital fingerprint in the columns.

When the virtual computer system service has obtained the digital fingerprint 404 for the configuration of the physical host 402 and the compatibility matrix 406, the virtual computer system service may identify the originating physical host configuration axis of the matrix 406 that corresponds to the digital fingerprint 404. Subsequently, the virtual computer system service may identify, for each digital fingerprint of the destination physical host configurations, values that may be used to determine whether the physical host 402 is compatible with physical host configurations having a corresponding digital fingerprint. For instance, the virtual computer system service may utilize the digital fingerprint and the compatibility matrix 406 to identify a plurality of physical host configuration matches. A physical host configuration match may be a row in the compatibility matrix 406, a configuration pair (e.g., an entry in the compatibility matrix 406), a record in a database (e.g., key value store, relational database), and the like.

The virtual computer system service may generate an ordering 408 of a corresponding set of compatible physical host configurations that may be used to identify physical hosts that may be used to instantiate virtual machine instances from the physical host 402. If the compatibility matrix 406 values are binary (e.g., 0 or 1), there may be no distinction among the compatible set of physical host configurations, as each of these physical hosts may be used to successfully instantiate the virtual machine instances from the physical host 402. Thus, the virtual computer system service may utilize the ordering to select any of the compatible physical host configurations. This, in turn, may be used to select a physical host that has the selected physical host configuration.

In some embodiments, the values specified in the compatibility matrix 406 are weighted such that certain pairings for a particular physical host configuration are more desirable than other compatible physical host configuration pairings. For instance, rather than using a binary set of values (e.g., 0 or 1, as illustrated in FIG. 4), the compatibility matrix 406 may incorporate values between 0 and 1 that may denote the weight to be assigned to each pairing. A higher weight value may denote a more desirable match between physical host configurations. Thus, when the virtual computer system service generates an ordering 408 of the corresponding set of compatible physical host configurations, the virtual computer system service may include the corresponding weight values for each of these compatible physical host configurations in the ordering 408. The virtual computer system service may evaluate this ordering 408 to select a physical host having a configuration with the highest weight value. If this physical host does not have sufficient capacity to support the virtual machine instances from the physical host 402, the virtual computer system service may select a physical host having a configuration with the next highest weight. This may continue until a physical host is identified that can support instantiation of the virtual machine instances from the physical host 402.

In an embodiment, the virtual computer system service can determine whether a particular configuration axis is to be added to the vector utilized to generate the digital fingerprint 404. For instance, the virtual computer system service may determine whether different values for a particular configuration axis has an impact on the compatibility of the physical hosts of the fleet. As an illustrative example, as new hardware and software are introduced, new values for particular configuration axes may be generated. The virtual computer system service may determine whether this new hardware and software have any impact on compatibility of the physical hosts. If so, the virtual computer system service may transmit a request to the physical hosts of the fleet to generate new digital fingerprints 404 that incorporate this newly relevant configuration axis into the vector of the digital fingerprint. Further, since this configuration axis may include a number of different values, there may be additional digital fingerprint permutations. Accordingly, the virtual computer system service may modify the compatibility matrix 406 to include additional entries for each possible pairing corresponding to these new digital fingerprint permutations.

Figure 5:
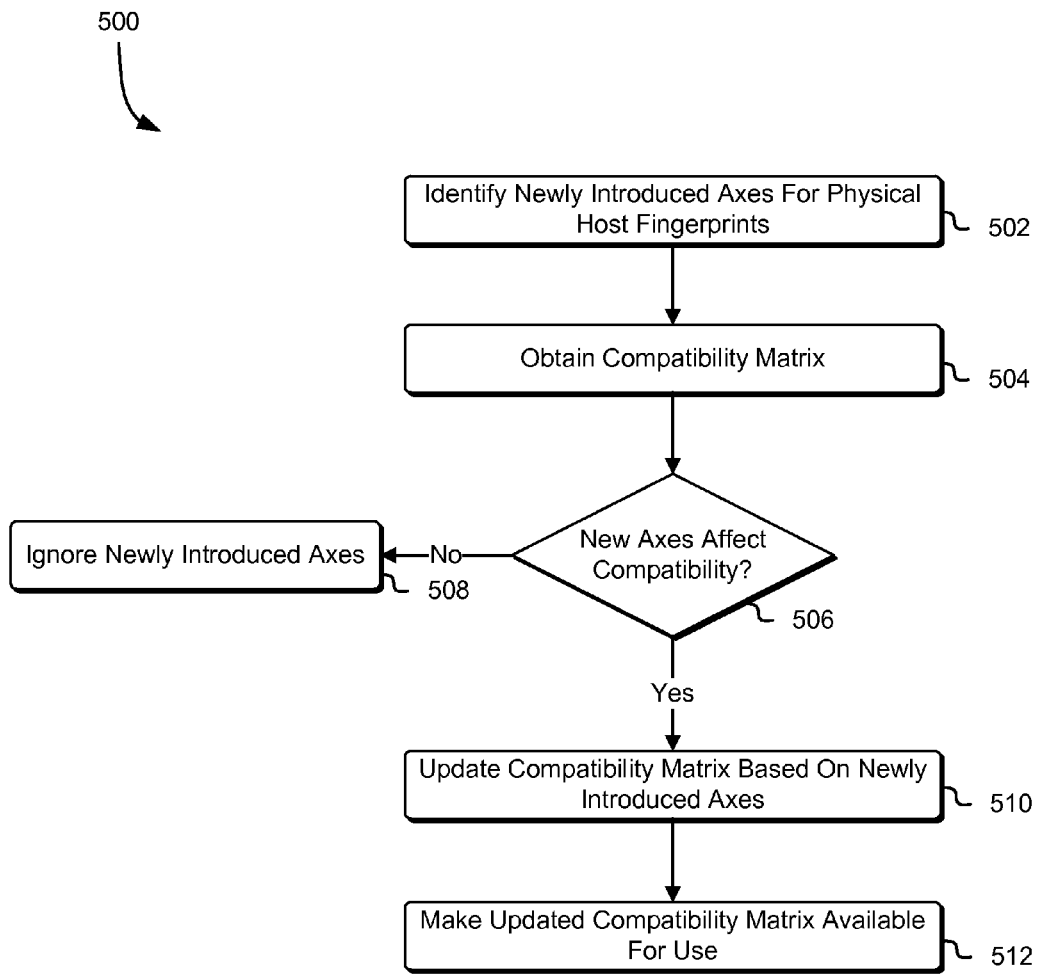
FIG. 5 shows an illustrative example of a process for updating a compatibility matrix for physical hosts based at least in part on introduction of one or more new fingerprint axes in accordance with at least one embodiment.

FIG. 5 shows an illustrative example of a process 500 for updating a compatibility matrix for physical hosts based at least in part on introduction of one or more new fingerprint axes in accordance with at least one embodiment. The process 500 may be performed by a testing system of the virtual computer system service. For instance, some operations described in the process 500 may be performed in conjunction with a host fingerprint repository. Further, some operations of the process 500 may cause other components of the virtual computer system service, such as the physical hosts of the fleet, to perform additional operations.

At any time, a testing service/system as described above may identify 502 one or more newly introduced axes that may need to be incorporated into the various digital fingerprints of the physical hosts in the fleet. For instance, over time, new physical hosts may be added to the fleet that have new hardware and software features (e.g., different configurations) that were previously not incorporated into the various configuration axes used to determine compatibility. Alternatively, an administrator of the virtual computer system service may configure the testing system to perform new benchmark tests to determine whether new configuration axes are required. In some instances, the addition of new physical hosts to the fleet may result in new possible values for these various configuration axes. Further, previously disregarded configuration axes, by virtue of introduction of these new values, may result in these configuration axes being important in determining compatibility among the physical host configurations of the fleet.

Once the testing system has identified any newly introduced configuration axes for the digital fingerprints, the testing system may access a host fingerprint repository to obtain 504 a compatibility matrix for the fleet. The testing system may evaluate the compatibility matrix to identify the current compatibility among the different configurations of the physical hosts of the fleet. For instance, the compatibility matrix may specify, for different digital fingerprints, a value that may be used to determine whether an originating physical host configuration is compatible with a particular destination physical host configuration. Further, through the compatibility matrix, the testing system may identify the current impact of the various values for the different applicable configuration axes used to generate these digital fingerprints.

When new physical host configurations are introduced, the testing system may determine whether these new configurations are compatible with existing physical host configurations and identify the sources of incompatibility. For instance, new software installed on a physical host may not be supported by physical hosts with older configurations as they may not have the processing capabilities to support this new software. As another example, some previously compatible components may no longer be compatible due to non-technical issues (e.g., contract obligations, licensing exclusivity etc.). This information may be utilized to determine 506 whether these new axes affect the compatibility of the physical hosts in the fleet. If the changes to the configuration of the physical hosts or the consideration of new axis values results no impact to the compatibility of the physical hosts in the fleet, the testing system may ignore 508 these newly introduced axes and indicate that the pre-existing digital fingerprints for the physical hosts in the fleet may continue to be used.

If the testing system determines that the new axes affect the compatibility of the physical hosts in the fleet, the testing system may update 510 the compatibility matrix based at least in part on these newly introduced axes. For instance, if a new axis is added to the vector used to generate a digital fingerprint for the physical host configurations, the testing system may identify new digital fingerprint variations based at least in part on the different values for this new axis. Further, if an existing axis now has additional values due to changes in the configuration of the physical hosts or introduction of new physical hosts with new configurations, the testing system may further consider these variations to identify new digital fingerprints that may be produced. The testing system may modify the compatibility matrix as described above to include new entries that correspond to these new digital fingerprint variations and indicate compatibility among the physical host configurations of the fleet.

Once the testing system has updated the compatibility matrix to include entries for the different digital fingerprint variations, the testing system may make 512 the updated compatibility matrix available for use. The testing system may store the updated compatibility matrix within the host fingerprint repository or otherwise indicate where the updated compatibility matrix may be stored to enable a host compatibility engine to obtain the compatibility matrix as needed. Thus, if a physical host presents a digital fingerprint that is based at least in part on the newly introduced axes, the host compatibility engine may use the digital fingerprint and the updated compatibility matrix to identify any compatible physical hosts.

Figure 6:
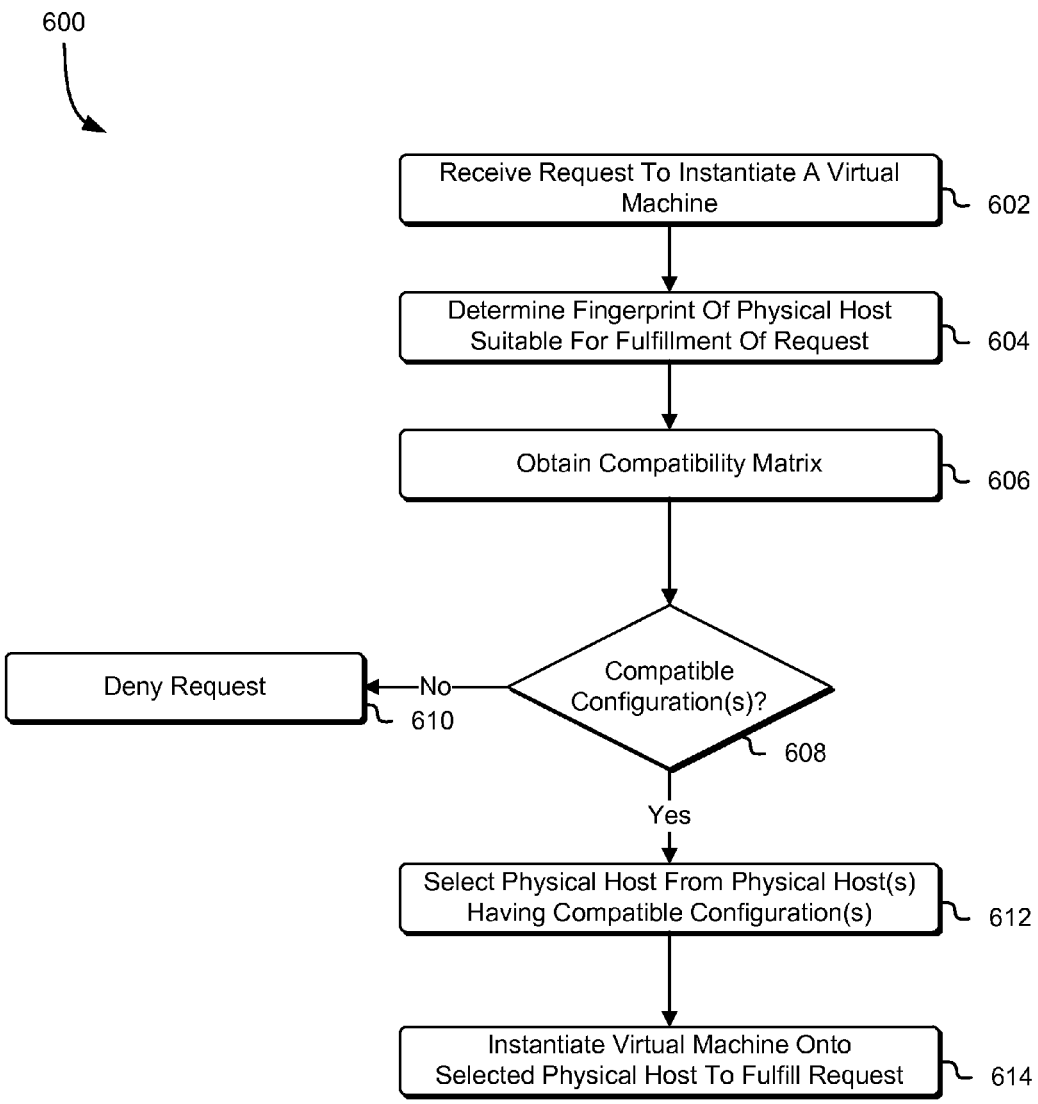
FIG. 6 shows an illustrative example of a process for instantiating a virtual machine onto a physical host based at least in part on use of a compatibility matrix for physical hosts in accordance with at least one embodiment.

As noted above, a virtual computer system service may utilize a compatibility matrix to identify one or more physical host configurations usable to select a physical host that may be used to instantiate a virtual machine in response to a customer request for instantiation of a new virtual machine. Accordingly, FIG. 6 shows an illustrative example of a process 600 for instantiating a virtual machine onto a physical host based at least in part on use of a compatibility matrix for physical host configurations in accordance with at least one embodiment. The process 600 may be performed by the aforementioned virtual computer system service, which may process customer requests to instantiate one or more virtual machines onto physical hosts of the fleet of physical hosts and analyze an applicable compatibility matrix to identify one or more compatible host configurations and select a physical host that can be used to instantiate the requested virtual machines.

At any time, the virtual computer system service may receive 602 a request to instantiate a virtual machine onto a physical host. The request may be made by a customer of the virtual computer system service, another service associated with the virtual computer system service, or other process. The request may specify a virtual machine image that may be used to instantiate the virtual machine. Further, in some instances, the request may further specify one or more desired physical host attributes for a physical host that is to be used to instantiate the virtual machine. For example, a customer may specify that the virtual machine may be instantiated onto a physical host that has significant processing capabilities, ample data storage capacity, a particular operating system, and a certain resource allocation unit size, and the like. This information may be used to identify the physical host that may be used to instantiate the virtual machine, as will be described below.

When the virtual computer system service receives this request to instantiate the virtual machine onto a physical host, the virtual computer system service may utilize the provided information to determine 604 a digital fingerprint of a physical host configuration that may be suitable for fulfillment of the request. The virtual computer system service may identify the configuration axes that are currently being utilized to generate the vector usable to generate the digital fingerprint. Once the virtual computer system service has identified these axes, the virtual computer system service may utilize the provided information in the request to determine the values for these axes and generate the digital fingerprint. Alternatively, if the service is able to identify a present configuration that matches the provided information, the service may obtain the digital fingerprint of this physical host configuration from the host fingerprint repository. In some embodiments, if the customer or other entity has not provided desired physical host configuration information, the virtual computer system service can utilize the characteristics of the virtual machine to determine the values for these configuration axes. For instance, information regarding the virtual machine may serve to indicate a recommended configuration of a physical host that may be suitable to support the virtual machine. Thus, the virtual computer system service may utilize this information to generate the digital fingerprint.

Once the virtual computer system service has determined the digital fingerprint of a physical host configuration suitable for fulfillment of the request, the virtual computer system service may obtain 606 the compatibility matrix from the host fingerprint repository to determine 608 whether there are any compatible physical host configurations that may be used to select a physical host that can be used to instantiate the virtual machine. As described above, the compatibility matrix may specify one or more compatibility values for pairings of physical host types (e.g., configurations) based at least in part on the known digital fingerprints corresponding to these physical host types. One axis of the compatibility matrix may correspond to the digital fingerprints of the originating physical host types and the other axis may correspond to the digital fingerprints of the destination physical host types. Since the physical hosts of the fleet may serve both as originating and destination physical hosts, the compatibility matrix may be a square matrix, as a physical host serving as both an originating physical host and a destination physical host may have the same digital fingerprint.

If, through an analysis of the compatibility matrix through use of the digital fingerprint, the virtual computer system service determines that there are no compatible host configurations available to instantiate the virtual machine, the virtual computer system service may deny 610 the request. However, if the virtual computer system service identifies one or more compatible host configurations through use of the digital fingerprint and the compatibility matrix, the virtual computer system service may select 612 a compatible physical host that may be used to instantiate the virtual machine and fulfill the request. For instance, if the compatibility matrix values are binary (e.g., 0 or 1, compatible or not compatible, etc.), the virtual computer system service may identify any physical host configurations that are compatible for instantiation of the virtual machine. In some embodiments, the compatibility matrix values are not binary and correspond to weights that may be used to identify preferred physical host configurations for instantiation of virtual machines. For instance, when the virtual computer system service determines the compatible physical host configurations and the corresponding weight values for these host configurations, the virtual computer system service may select the physical host having a configuration with the highest weight value to determine its availability. If it is not available, the service may select the physical host having a configuration with the next highest weight and so forth until a physical host is selected that is available for instantiation of the virtual machine.

Once the virtual computer system service has selected a compatible physical host for instantiation of the virtual machine, the virtual computer system service may instantiate 614 the virtual machine onto the selected physical host to fulfill the request. The virtual computer system service may allocate one or more resource allocation units, as needed, within the physical host to the instantiation of the virtual machine. The service may further indicate to the customer or other entity that the virtual machine is available for use and provide information regarding the physical host being utilized to support the virtual machine, such as physical host identifiers, physical host location, Internet Protocol addresses, and the like.

Figure 7:
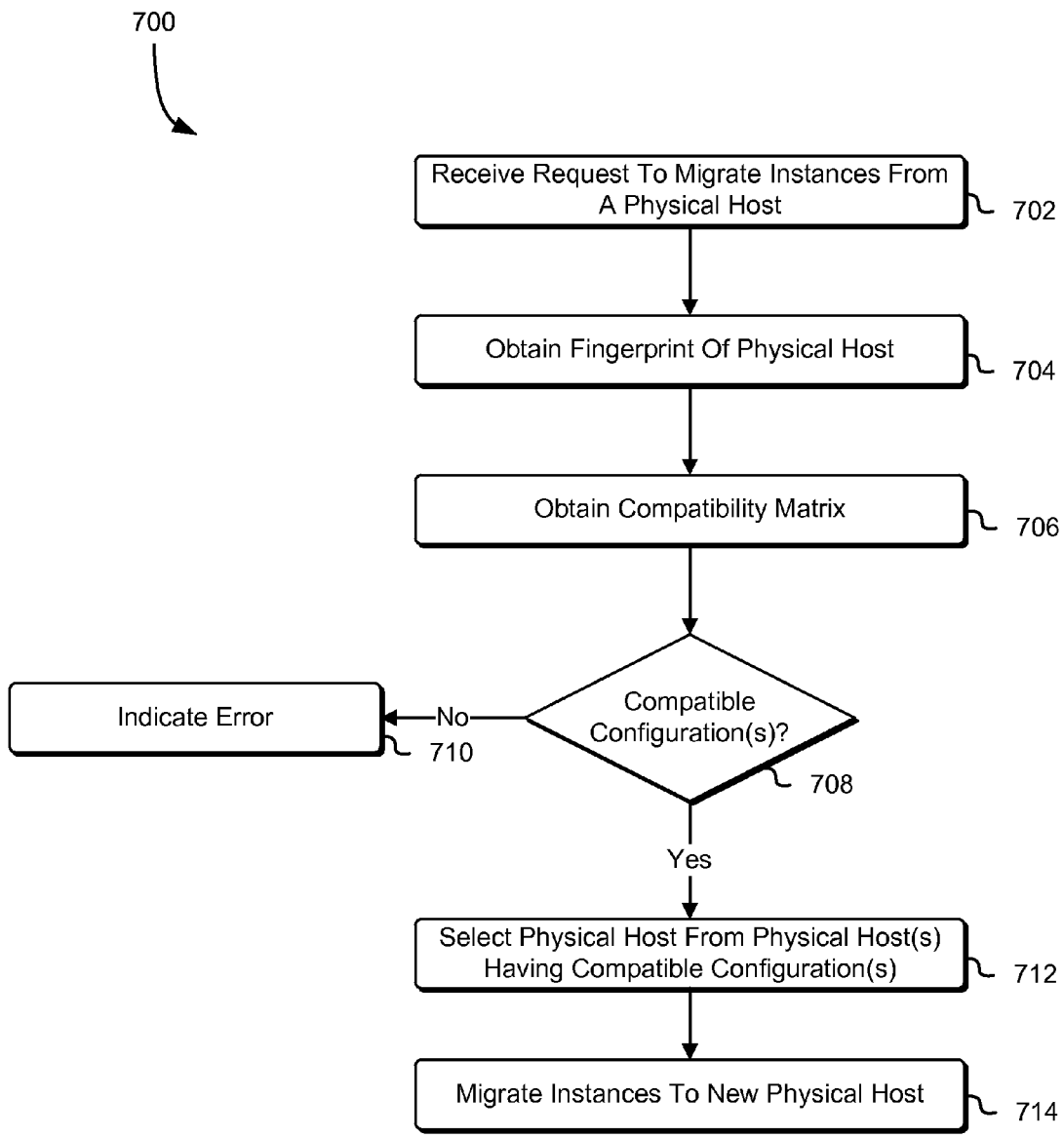
FIG. 7 shows an illustrative example of a process for migrating one or more virtual machine instances from an originating physical host to a new physical host based at least in part on use of a compatibility matrix for physical hosts in accordance with at least one embodiment.

As noted above, a virtual computer system service may utilize a compatibility matrix to identify one or more physical hosts that may be used to instantiate one or more virtual machines as a result of a migration of these one or more virtual machines from an originating physical host. Accordingly, FIG. 7 shows an illustrative example of a process 700 for migrating one or more virtual machine instances from an originating physical host to a new physical host based at least in part on use of a compatibility matrix for physical hosts in accordance with at least one embodiment. The process 700 may be performed by the aforementioned virtual computer system service, which may process migration requests and operations from an originating physical host and analyze an applicable compatibility matrix to identify and select a physical host that can be used to instantiate the virtual machines that are to be migrated.

At any time, the virtual computer system service may receive 702 a request to migrate one or more virtual machine instances from a physical host to a compatible physical host of a fleet. For instance, a customer may submit a request to the service to migrate one or more existing virtual machine instances from a physical host to a different physical host. Alternatively, the request may be generated by a management sub-system of the service in response to an issue identified with the physical host. For instance, if the physical host has started to exhibit reduced reliability, the management sub-system may attempt to migrate these virtual machine instances to another physical prior to a complete failure of the originating physical host.

Once the virtual computer system service has received a request to migrate one or more virtual machines from the physical host to a compatible physical host, the virtual computer system service may obtain 704 the digital fingerprint corresponding to the configuration of the originating physical host. As described above, each physical host of the fleet may be configured to generate a digital fingerprint comprising a representation of a vector that specifies one or more values for respective configuration axes. These configuration axes may correspond to components (e.g., hardware, software, resource allocation units, etc.) of the physical host and may have differing values based at least in part on the configuration of the physical host. The physical host may transmit this digital fingerprint to a host fingerprint repository for storage. Thus, the virtual computer system service may access the host fingerprint repository to identify and obtain the digital fingerprint for the configuration of the physical host. Alternatively, the virtual computer system service may transmit a request to an agent operating within the physical host to generate the digital fingerprint. This may cause the agent to evaluate the configuration of the physical host and utilize the results of this evaluation to generate the digital fingerprint and provide the digital fingerprint to the virtual computer system service.

The virtual computer system service may further obtain 706 the compatibility matrix from the host fingerprint repository to determine 708 whether there are any compatible physical host configurations to the physical host migrating its one or more virtual machine instances. As described above, the compatibility matrix may specify one or more compatibility values for pairings of physical host types based at least in part on the known digital fingerprints corresponding to these physical host types. One axis of the compatibility matrix may correspond to the digital fingerprints of the originating physical host configurations and the other axis may correspond to the digital fingerprints of the destination physical host configurations. Since the physical hosts of the fleet may serve both as originating and destination physical hosts, the compatibility matrix may be a square matrix, as a physical host serving as both an originating physical host and a destination physical host may have the same digital fingerprint.

If, through an analysis of the compatibility matrix through use of the digital fingerprint, the virtual computer system service determines that there are no compatible host configurations available, the virtual computer system service may indicate 710 that there is an error in migrating the virtual machine instances. However, if the virtual computer system service identifies one or more compatible host configurations through use of the digital fingerprint and the compatibility matrix, the virtual computer system service may select 712 a new physical host having a compatible physical host configuration and that may be used to instantiate the virtual machine to fulfill the request. For instance, if the compatibility matrix values are binary (e.g., 0 or 1, compatible or not compatible, etc.), the virtual computer system service may identify any physical hosts having configurations that are compatible for instantiation of the virtual machine. In some embodiments, the compatibility matrix values are not binary and correspond to weights that may be used to identify preferred physical host configurations for physical hosts usable for instantiation of virtual machines. For instance, when the virtual computer system service determines the compatible physical host configurations and the corresponding weight values for these configurations, the virtual computer system service may select a physical host having a configuration with the highest weight value to determine its availability. If it is not available, the service may select a physical host having a configuration with the next highest weight and so forth until a physical host is selected that is available. Once the virtual computer system service has selected a new physical host, the virtual computer system service may cause the originating physical host to migrate 714 the one or more instances to the new physical host.

Figure 8:
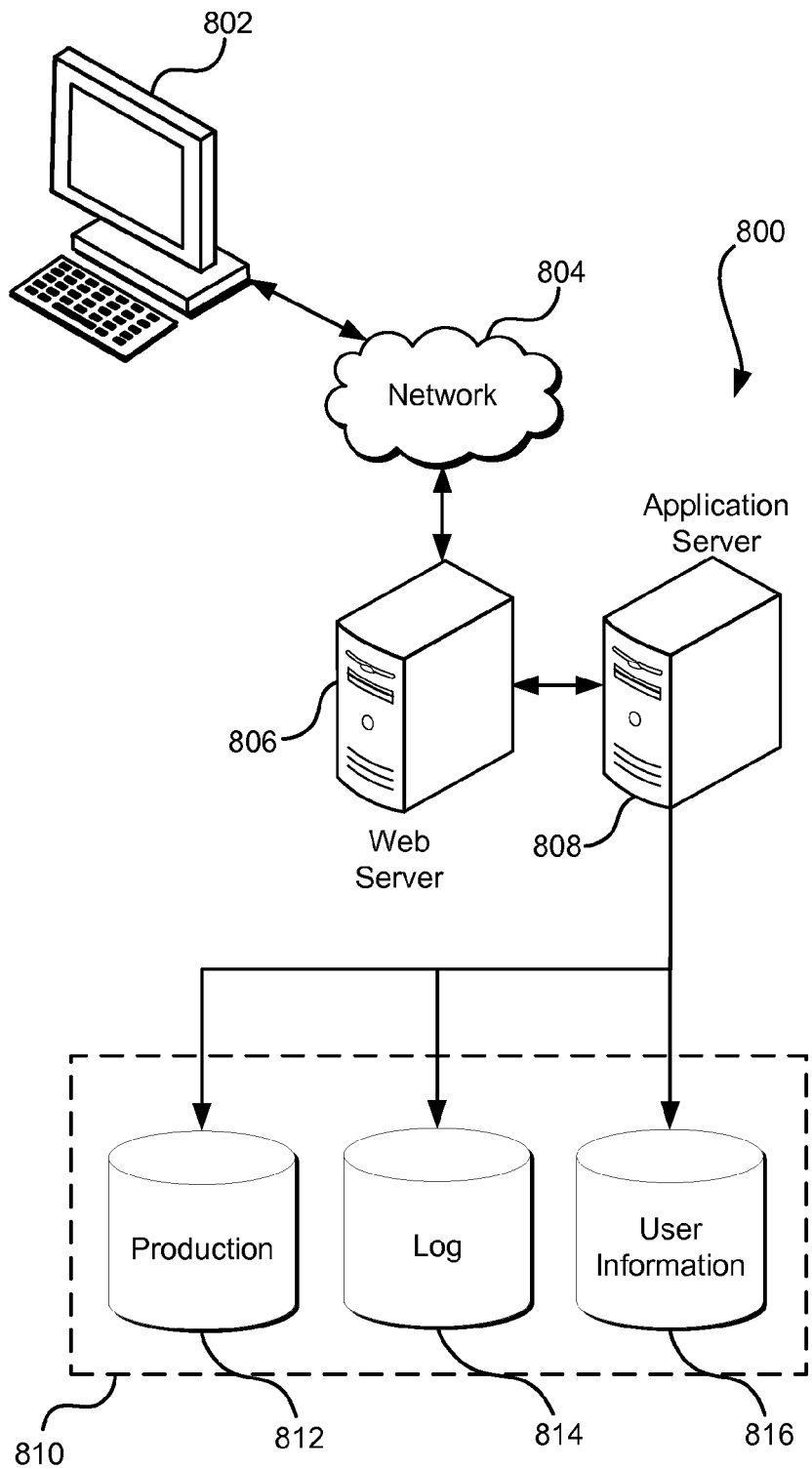
FIG. 8 shows an illustrative example of an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network. The system may comprise at least one computing device configured to implement one or more services.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: $\{A\}$, $\{B\}$, $\{C\}$, $\{A, B\}$, $\{A, C\}$, $\{B, C\}$, $\{A, B, C\}$. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request to migrate a virtual machine instance, the virtual machine instance being instantiated by a first physical host that is a member of a fleet of physical hosts;
   obtaining, from a digital fingerprint repository, a digital fingerprint of the first physical host, the digital fingerprint being a representation of vectors comprising a set of configuration values that each describes a hardware or software characteristic of the first physical host;
   obtaining a compatibility matrix comprising:
      a first axis that corresponds to a first set of vectors of originating physical host configurations;
      a second axis that corresponds to a second set of vectors of destination physical host configurations, the first set of vectors and the second set of vectors being represented by a plurality of digital fingerprints; and
      a set of compatibility values for pairings of the originating physical host configurations and the destination physical host configurations;
   using the digital fingerprint of the first physical host and the compatibility matrix to select a physical host configuration, the physical host configuration thereby becoming a selected physical host configuration;
   selecting, from the fleet of physical hosts, a second physical host having the selected physical host configuration; and
   migrating the virtual machine instance from the first physical host to the second physical host.

2. The computer-implemented method of claim 1, wherein:
   the set of compatibility values of the compatibility matrix are weighted; and
   selection of the pairings of originating physical host configurations and the destination physical host configurations is made based at least in part on the pairings of originating physical host configurations and the destination physical host configurations having a higher weighted compatibility value than other compatibility values for other pairings of originating physical host configurations and the destination physical host configurations.

3. The computer-implemented method of claim 1, further comprising:
   identifying one or more new configuration values of the physical host;
   determining whether the one or more new configuration values of the physical host impact compatibility between a first pairing of the pairings of originating physical host configurations and the destination physical host configurations to support virtual machine instances; and
   updating the compatibility matrix to indicate whether the first pairing is compatible for supporting the virtual machine instances based at least in part on the one or more new configuration values.

4. The computer-implemented method of claim 1, further comprising:
   receiving a third request to instantiate a third virtual machine instance;
   determining a third digital fingerprint that is specific to a third configuration of another physical host that can be used to instantiate the third virtual machine instance;
   determining, using the third digital fingerprint and the compatibility matrix, that there are no compatible physical host configurations; and
   denying the third request.

5. The computer-implemented method of claim 1, further comprising:
   receiving a second request to instantiate a second virtual machine instance;
   determining a second digital fingerprint that is specific to a second configuration of another physical host that can be used to instantiate the second virtual machine instance;
   using the second digital fingerprint and the compatibility matrix to select another physical host configuration;
   selecting, from the fleet of physical hosts, a physical host having the other physical host configuration; and
   instantiating the second virtual machine instance onto the selected physical host having the other physical host configuration.

6. The computer-implemented method of claim 1, wherein the digital fingerprint is a cryptographic hash of the vectors.

7. A system, comprising at least one computing device that implements one or more services, wherein the one or more services:
   determine a digital fingerprint of a first physical host configuration, the digital fingerprint being a representation of vectors comprising a set of configuration values that each describes a hardware or software characteristic of a first physical host;
   obtain a data structure that specifies compatibility values for pairings of physical host configurations, the data structure including:
      a first axis that corresponds to a first set of vectors of originating physical host configurations;
      a second axis that corresponds to a second set of vectors of destination physical host configurations, the first set of vectors and the second set of vectors being represented by a plurality of digital fingerprints; and
      a set of compatibility values for pairings of originating physical host configurations and the destination physical host configurations;
   use the digital fingerprint of the first physical host configuration and the data structure to select a second physical host configuration;
   select, from a fleet of physical hosts, a second physical host having the second physical host configuration; and
   instantiate a virtual machine instance onto the second physical host.

8. The system of claim 7, wherein:
   the physical host configurations are specific to respective digital fingerprints; and
   the data structure is indexed at least in part by the respective digital fingerprints.

9. The system of claim 7, wherein the instantiation of the virtual machine instance onto the second physical host is an operation of a workflow to migrate the virtual machine instance from a physical host having the first physical host configuration to the second physical host.

10. The system of claim 7, wherein the data structure is a compatibility matrix that specifies the set of compatibility values for pairings of the physical host configurations.

11. The system of claim 7, wherein:
the set of compatibility values of the data structure compatibility matrix are weighted based at least in part on a preference for one or more pairings of the pairings of physical host configurations; and
the one or more services are further configured to select the second physical host as a result of the second physical host configuration having a higher weighted compatibility value than other set of compatibility values for other physical host configurations.

12. The system of claim 7, wherein the one or more services are further configured to:
identify one or more new configuration parameters for the first physical host configuration; and
update the data structure to incorporate the one or more new configuration parameters.

13. The system of claim 7, wherein the digital fingerprint of the first physical host configuration is determined based at least in part on one or more characteristics of the virtual machine instance.

14. The system of claim 7, wherein the compatibility values for pairings of the physical host configurations specify whether destination physical hosts of the pairings can support virtual machine instances supportable by originating physical hosts.

15. A non-transitory computer-readable storage medium having stored thereon executable instructions that, as a result of being executed by one or more processors of a computer system, cause the computer system to:
store a plurality of physical host configuration matches, the plurality of physical host configuration matches comprising a first axis that corresponds to a first set of vectors of originating physical host configurations and a second axis that corresponds to a second set of vectors of destination physical host configurations, the first set of vectors and the second set of vectors being indexed at least in part by a plurality of digital fingerprints;
select, based at least in part on a first physical host configuration, a set of second physical host configurations from the plurality of physical host configuration matches; and
provide the selected set of second physical host configurations.

16. The non-transitory computer-readable storage medium of claim 15, wherein the executable instructions further cause the computer system to receive the first physical host configuration in response to a request to migrate a virtual machine instance from a physical host having the first physical host configuration to a compatible physical host.

17. The non-transitory computer-readable storage medium of claim 15, wherein the executable instructions further cause the computer system to receive the first physical host configuration in response to a request to instantiate a virtual machine instance, whereby the first physical host configuration specifies a configuration of another physical host that can be used to instantiate the virtual machine instance.

18. The non-transitory computer-readable storage medium of claim 15, wherein the plurality of physical host configuration matches are stored in a compatibility matrix that specifies whether pairings of the physical host configurations are compatible.

19. The non-transitory computer-readable storage medium of claim 15, wherein the executable instructions further cause the computer system to select a physical host configuration from the selected set of physical host configurations based at least in part on weighted values of the selected set, the weighted values based at least in part on a preference for one or more pairings of a set of pairings of physical host configurations.

20. The non-transitory computer-readable storage medium of claim 15, wherein the physical host configurations are specific to respective digital fingerprints such that the plurality of physical host configuration matches are indexed at least in part by the respective digital fingerprints.

21. The non-transitory computer-readable storage medium of claim 15, wherein the executable instructions further cause the computer system to update the plurality of physical host configuration matches as a result of identification of one or more new configuration parameters of at least one physical host.

* * * * *